US007325519B2

(12) United States Patent
Sugimoto et al.

(10) Patent No.: US 7,325,519 B2
(45) Date of Patent: *Feb. 5, 2008

(54) ENGINE OPERATED GENERATOR

(75) Inventors: Yasuhiro Sugimoto, Saitama (JP);
Hiroaki Kojima, Saitama (JP);
Kazuhito Takemura, Saitama (JP);
Katsuhiro Nakagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/591,304

(22) PCT Filed: Sep. 20, 2005

(86) PCT No.: PCT/JP2005/017294

§ 371 (c)(1),
(2), (4) Date: Sep. 1, 2006

(87) PCT Pub. No.: WO2006/035636

PCT Pub. Date: Apr. 6, 2006

(65) Prior Publication Data

US 2007/0137591 A1    Jun. 21, 2007

(30) Foreign Application Priority Data

Sep. 29, 2004    (JP) .............................. 2004-285036

(51) Int. Cl.
*F02B 63/04* (2006.01)
*F02B 77/00* (2006.01)

(52) U.S. Cl. ......................................... 123/41.7; 123/2

(58) Field of Classification Search ............... 123/41.7, 123/2–3, 27 GE, 527, 529, 557; 290/1 B, 290/2

See application file for complete search history.

(56) References Cited

U.S. PATENT DOCUMENTS 6,332,433 B1* 12/2001 Kobayashi et al. ............ 123/2
7,146,962 B2* 12/2006 Sugimoto et al. ....... 123/198 E

FOREIGN PATENT DOCUMENTS

| JP | 61-155655 | 7/1986 |
| JP | 63-171632 | 11/1988 |
| JP | 02-023260 | 1/1990 |
| JP | 10-131810 | 5/1998 |
| JP | 11-241653 | 9/1999 |
| JP | 2003-314372 | 11/2003 |

* cited by examiner

*Primary Examiner*—Hai Huynh
(74) *Attorney, Agent, or Firm*—Carrier, Blackman & Associates, P.C.; William D. Blackman; Joseph P. Carrier

(57) ABSTRACT

An engine operated generator is provided with an engine, a generator driven by the engine, and a power control unit for controlling the power generated by the generator. A fuel gas stored in fuel bottles set in a case for the engine operated generator, is supplied to the engine though a fuel pressure regulator. The fuel bottles and the fuel pressure regulator are disposed adjacent to the power control unit to enable heat exchange with the power control unit provided with an inverter. Thus, heat is mutually utilized between the power control unit and at least one of the fuel bottles as fuel receptacles and the fuel pressure regulator.

18 Claims, 10 Drawing Sheets

FIG. 7

| | Fuel system selector valve | | |
|---|---|---|---|
| | First position | Cutoff position | Second position |
| Fuel supply | Fuel bottle (Butane gas) | Cutoff | External fuel system (Propane gas) |
| Ignition system | Operative (Kill switch is open) | Inoperative (Kill switch is closed) | Operative (Kill switch is open) |
| Heating device | Operative (Heater switch is closed) | Inoperative (Heater switch is open) | Inoperative (Heater switch is open) |

ENGINE OPERATED GENERATOR

CROSS-REFERENCE TO RELATED APPLICATIONS

The present application is a U.S. National phase of, and claims priority based on PCT/JP2005/017294 filed 20 Sep. 2005, which, in turn, claims priority from Japanese patent application 2004-285036, filed 29 Sep. 2004. The entire disclosure of each of the referenced priority documents is incorporated herein by reference.

TECHNICAL FIELD

The present invention relates to an engine operated generator having an engine to which is supplied a fuel gas stored in fuel receptacles in liquefied state, and an electric generator driven by the engine.

BACKGROUND ART

Engine operated generators are widely used as an electric source such as a temporary outdoor electric source and an emergency power supply. In case such engine operated generators are leisure or emergency equipment, a gas engine is often provided which uses fuel gas stored a small fuel receptacle, such as cassette fuel bottle.

The fuel gas is stored in the fuel receptacle in liquefied state and supplied to the gas engine in gasified state. When the operation of the gas engine is started and the fuel gas is supplied to the gas engine, the fuel gas stored in the fuel receptacle in liquefied state begins to be gasified under influence of reduction in the gas pressure to maintain the equilibrium between the liquid phase and the gas phase in the receptacle. For this reason, a large amount of latent heat of evaporation is needed, which reduces the temperature of the fuel receptacle. A fuel pressure regulator provided for regulating the pressure of the fuel gas is also caused to be reduced in temperature due to inflow of reduced-temperature fuel gas immediately after the gasification thereof and due to pressure reduction of the fuel gas itself.

If the temperature of the fuel receptacle is reduced excessively, gasification of the fuel gas becomes insufficient, so that the fuel gas pressure is reduced with a result that the fuel gas will not be supplied smoothly to the gas engine. As a measure to prevent this, it is known to heat the fuel receptacle by a heater in response to the temperature of the fuel gas receptacle and the gas pressure within the receptacle (For example, refer to Patent Documents 1 and 2).

On the other hand, a power control unit provided in the engine operated generator to control electric power generated by the electric generator, produces a large amount of heat due to its operation. A number of measures to cool the power control unit were known. Patent Document 3 discloses an engine operated generator having a sound proof case which encloses an engine, a generator and a control circuit unit (corresponding to the power control unit), wherein a box encasing the control circuit unit is provided with heat dissipating fins which are exposed to a cooling air inlet and are in contact with an end wall of the cooling air inlet.

Patent Document 1: JP 10-131810 A
Patent Document 2: JP 2671015 B
Patent Document 3: JP U 63-171632 A The above-mentioned measure to heat the fuel receptacle by the heater has a problem in the manner of how the heater is provided and the manner to heat the receptacle, including how control of the heater is carried out without complication. Further, the cooling of the power control unit by cooling air involves a problem in that there are restrictions to the arrangement of the power control unit and its associated parts and complication in the structure.

SUMMARY OF THE INVENTION

The present invention has been made in view of the foregoing circumstances and of the fact that the fuel receptacle storing the fuel gas in liquefied state undergoes temperature reduction while the power control unit undergoes temperature rise. The principal purpose of the present invention is to mutually utilize heat between the power control unit and at least one of the fuel receptacle and the fuel pressure regulator. Other objects of the present invention are to make it possible to effectively carry out the cooling of the power control unit by the fuel receptacle and the heating of the fuel receptacle by the power control unit, and to increase the freedom of arrangement of the fuel receptacle and the power control unit. Further objects of the present invention are to further increase the effect of cooling the power control unit by one of the fuel receptacle and the fuel pressure regulator and the effect of heating at least one of the fuel receptacle and the fuel pressure regulator by the power control unit, to increase the effect of cooling the power control unit, the generator and the engine, to cool an inverter of the power control unit that has a large switching loss and a large amount of generated heat, and to heat at least one of the fuel receptacle and the fuel pressure regulator utilizing the heat from the inverter.

To attain the above objects, the present invention provides an engine operated generator comprising a fuel receptacle storing a fuel gas in liquefied state, an engine that receives the fuel gas from the fuel receptacle, a fuel pressure regulator for regulating pressure of the fuel gas supplied from the fuel receptacle to the engine, a generator driven by the engine, and a power control unit for controlling power generated by the generator, wherein at least one of the fuel receptacle and the fuel pressure regulator is arranged adjacent to the power control unit, for heat exchange with the power control unit.

According to the invention, at least one of the fuel receptacle and the fuel pressure regulator, which are reduced in temperature due to gasification of the fuel during the operation of the engine operated generator, is arranged adjacent to the power control unit in heat exchange relation with the power control unit. As a result, heat dissipation from the power control unit can be increased, in other words, cooling of the power control unit is promoted by at least one of the fuel receptacle and the fuel pressure regulator, whereby temperature rise of the power control unit is suppressed. On the other hand, at least one of the fuel receptacle and the fuel pressure regulator is heated by the power control unit, whereby temperature drop of the fuel receptacle and the fuel pressure regulator is suppressed.

The engine operated generator according to the present invention may be provided with a fuel storage chamber for storing the fuel receptacle, the fuel storage chamber having a side wall and heat transfer means made of a heat conducting material, the fuel receptacle and the side wall being thermally connected via the heat transfer means, the side wall being disposed adjacent to the power control unit to enable heat exchange with the power control unit.

According to this feature, heat transfer from the power control unit to the fuel receptacle and heat dissipation from the power control unit are carried out through the side wall to which heat from the fuel receptacle is transmitted. Therefore, restriction to the arrangement of the fuel receptacle and the power control unit is almost eliminated for realizing heat exchange between the fuel receptacle and the power control unit. The quantity of heat transferred between the fuel receptacle and the power control unit can be increased by increasing the area of the side wall and by disposing the side wall as close as possible to the power control unit. It will thus be apparent that mutual utilization of heat between the fuel receptacle and the power control unit can be realized.

Preferably, the heat transfer means comprises a plurality of columnar members provided between the fuel receptacle and the side wall of the fuel storage chamber to be in contact with the fuel receptacle and the side wall.

According to the present invention, at least one of the fuel receptacle and the fuel pressure regulator may be in direct thermal connection with the power control unit via heat transfer means made of a material of high heat conductivity.

According to this feature, mutual utilization of heat between the power control unit and at least one of the fuel receptacle and the fuel pressure regulator is increased since heat transfer is made via the heat transfer means.

The power control unit typically has an inverter.

The inverter has a large switching loss and generates a large amount of heat, so that it is heated. The heated inverter is thus cooled effectively by at least one of the fuel receptacle and the fuel pressure regulator, and is prevented from temperature rise, while at least one of the fuel receptacle and the fuel pressure regulator is heated effectively by the heated inverter, whereby temperature drop of them is suppressed.

Preferably, the engine operated generator comprises a case forming an internal space for accommodating the fuel receptacle, the engine and the generator; and a cooling air passage for conducting cooling air from the internal space sequentially past the fuel receptacle, the power control unit in this order, to the generator and the engine to cool the same.

According to this feature, cooling air introduced into the internal space of the case is cooled by the fuel receptacle to be reduced in temperature. The cooled cooling air then first cools the power control unit and then cools the generator and the engine. The power control unit is more efficiently cooled by the mutual utilization of heat between itself and at least one of the fuel receptacle and the fuel pressure regulator, than a case without the mutual utilization of heat. As a consequence, the temperature of the cooling air after cooling the power control unit is made lower than in the case without the mutual utilization of heat.

Preferably, the fuel pressure regulator and the power control unit are disposed on a side opposite the fuel storage chamber with respect to the side wall, and the power control unit is disposed below the fuel pressure regulator.

Further, the case may have a side wall having an upper edge along which a cooling air inlet passage is provided, and the fuel pressure regulator may be provided immediately downstream of the cooling air inlet passage.

The present invention provides the following advantages. Since heat is utilized mutually between the power control unit and at least one of the fuel receptacle and the fuel pressure regulator, temperature rise of the power control unit is suppressed and therefore heat dissipating structure for the power control unit can be in small size. Furthermore, since temperature rise of at least one of the fuel receptacle and the fuel pressure regulator is suppressed, it is not required to provide a heating device for heating the fuel receptacle or the fuel pressure regulator. Even if a heating device is provided, the heating capacity of the heating device can be made small, which means that free choice of the heating device is assured. Thus, in case the heating device is an electric heater, the power consumption of the electric heater can be reduced.

According to the preferred embodiment of the invention, the following advantages are obtained in addition to the above-stated advantages. Since heat is mutually utilized through the side wall between the fuel receptacle and the power control unit, the degree of freedom of arrangement of the fuel receptacle and the power control unit is increased, and the degree of mutual utilization of heat between the fuel receptacle and the power control unit is made high, whereby the cooling of the power control unit by the fuel receptacle and the heating of the fuel receptacle by the power control unit can be realized with an increased effectiveness.

A further advantage below is obtainable by the embodiment of the invention. Since the degree of mutual utilization of heat between the power control unit and at least one of the fuel receptacle and the fuel pressure regulator is increased, one of the cooling effect on the power control unit by at least one of the fuel receptacle and the fuel pressure regulator and the heating effect on at least one of the fuel receptacle and the fuel pressure regulator by the power control unit is further improved.

A further advantage below is obtainable by the embodiment of the invention. The power control unit can be cooled effectively by the cooling air which has been cooled, so that the generator and the engine can also be cooled with increased effectiveness.

A further advantage below is obtainable by the embodiment of the invention. The inverter generating a large amount of heat is cooled effectively, while at least one of the fuel receptacle and the fuel pressure regulator is heated effectively.

BRIEF DESCRIPTION OF THE DRAWINGS

FIG. 7 is a table of assistance in explaining the relation of the operating position of the fuel valve with a fuel supply system and an ignition system in the engine generator shown in FIG. 2;

DESCRIPTION OF THE REFERENCE NUMERALS

1 . . . Engine generator, 3 . . . Bottom cover, 4 . . . Top cover, 5 . . . Front cover, 6 . . . Back cover, 7 . . . Left side cover, 8 . . . Right side cover, 9 . . . Internal space, 12 . . . Fuel system selector valve, 16, 17, 90 . . . Carrying handle, 18, 19, 92 . . . Inlet passage, 20 . . . Outlet, 23, 24, 91 . . . Depressed part, 28, 29, 93 . . . Hand spaces, 30 . . . Engine, 40 . . . Generator, 41 . . . Power control unit, 42 . . . Ignition plug, 44 . . . Ignition coil, 45 . . . Cooling fan, 46 . . . Recoil starter, 47 . . . Shroud, 48 . . . Fan cover, 49 . . . Starter cover, 50,51 . . . Inlet, 60 . . . Fuel storage structure, 61 . . . Fuel bottle, 62 . . . Fuel pressure regulator, 63 . . . Fuel cutoff valve, 65 . . . Fuel storage chamber, 66 . . . Side wall, 68 . . . Fuel bottle detector, 70 . . . Heat transfer member, 71 . . . External fuel bottle, 73 . . . Pressure sensor, 74 . . . Kill switch, 75 . . . Main switch, 80 . . . Heating device, 89 . . . ECU, C . . . Case, Fa . . . Fuel supply system.

DESCRIPTION OF THE PREFERRED EMBODIMENTS

Preferred embodiments of the present invention will be described with reference to FIGS. 1 to 10.

Figure 1:
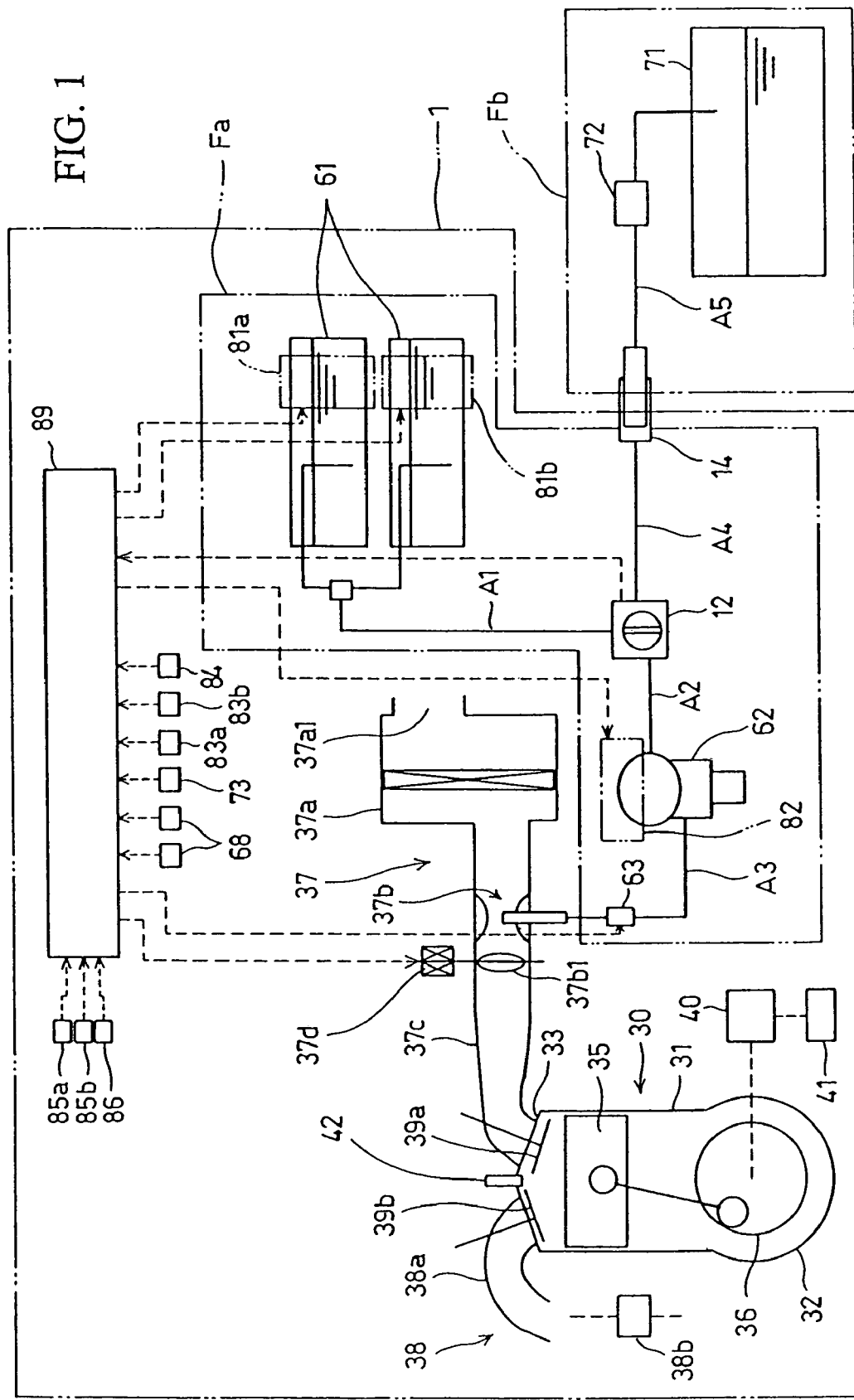
FIG. 1 is a diagrammatic view of an engine generator in a first embodiment of the present invention.

FIGS. 1 to 7 show a first embodiment of the present invention. Referring to FIG. 1, a portable engine generator 1 to which the present invention is applied can be connected to an external fuel system Fb.

Figure 2:
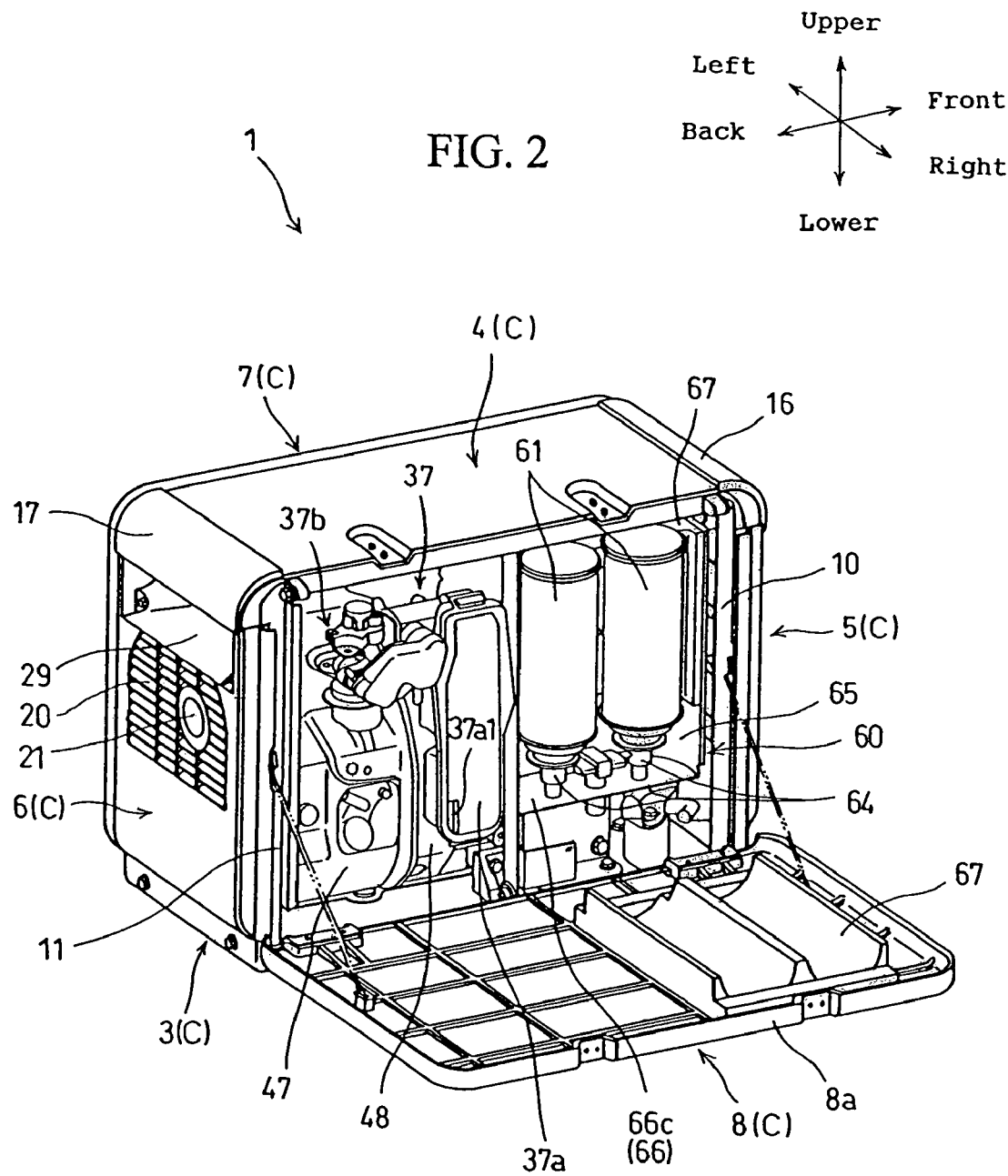
FIG. 2 is a perspective view of the engine generator shown in FIG. 1.
Figure 3:
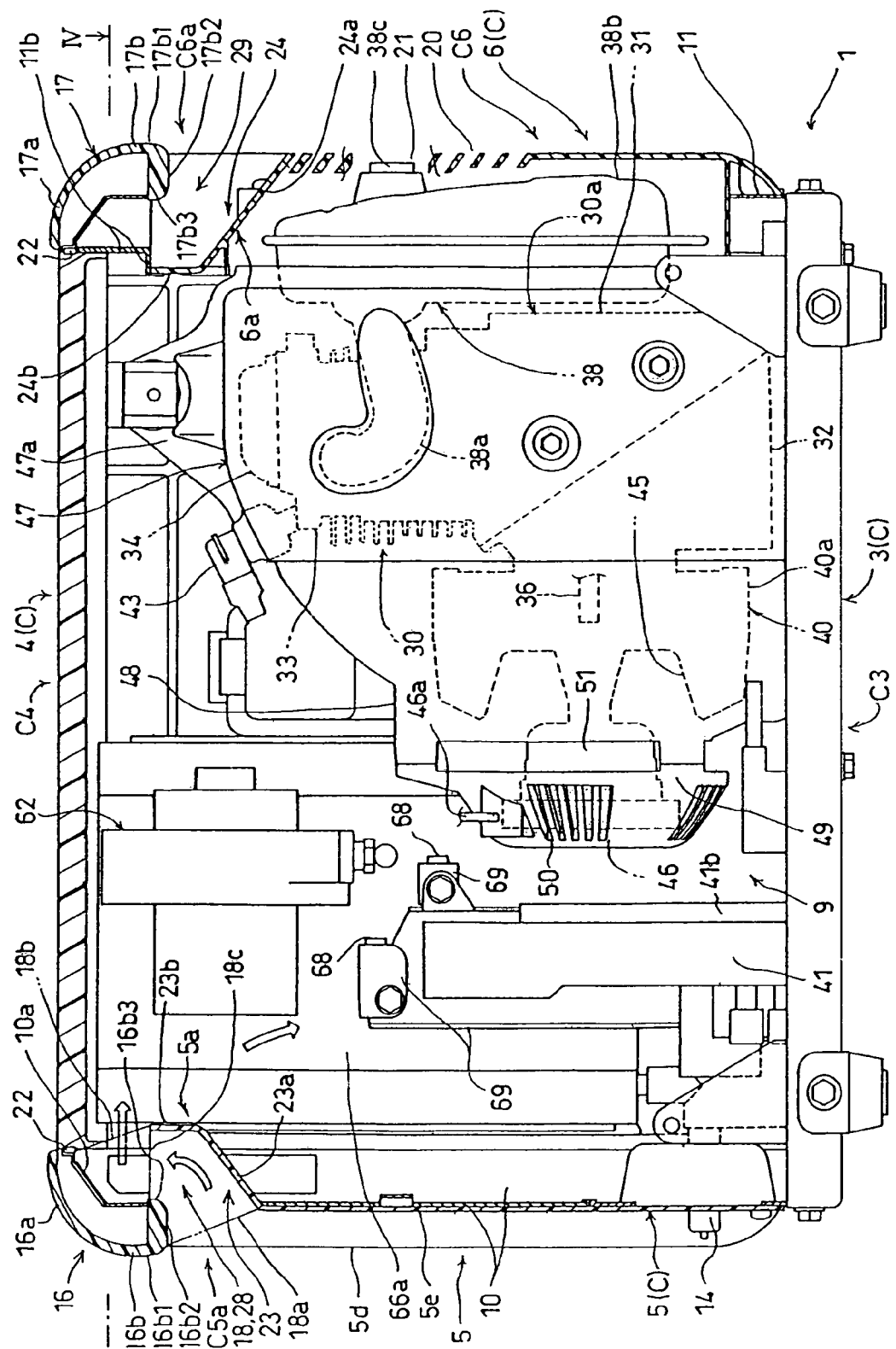
FIG. 3 is a sectional side elevation of the engine generator shown in FIG. 2 taken from the left side of the engine generator with its left side cover removed, in which a front cover, a back cover and a top cover are shown in a sectional view taken on the line III-II in FIG. 4.

Referring to FIGS. 2 and 3, the engine generator 1 includes a box-shaped case C in the form of a rectangular body, a pair of carrying handles 16 and 17 combined with the case C, a combustion engine 30, such as a gas engine, a fuel supply system Fa for supplying a fuel gas to the engine 30, an electric generator 40, namely, a working machine, to be driven for operation by the engine 30, a power control unit 41 for controlling power generated by the generator 40, and an electronic control unit (ECU) 89 for controlling the engine 30 and the fuel supply system Fa. The engine 30, the fuel supply system Fa, the generator 40, the power control unit 41 and the ECU 89 are housed in the case C having an internal space 9. The case C is a soundproof structure capable of suppressing the leakage of noise generated by the engine 30 during operation to the outside the case C.

An expression "grip the carrying handles 16 and 17" used in this specification signifies both gripping the carrying handles 16 and 17 and putting hands on the carrying handles 16 and 17.

Referring to FIGS. 2 to 5, the case C has a bottom cover 3, a top cover 4, a front cover 5, a back cover 6, a left side cover 7 and a right side cover 8. The bottom cover 3 and the top cover are vertically opposed to each other. The front cover 5 and the back cover 6 are longitudinal opposed to each other with respect to a first direction. The left side cover 7 and the right side cover 8 are laterally opposed to each other with respect to a second direction. The covers 3 to 8 are made of a synthetic resin.

In this embodiment, the first direction is a longitudinal direction and the second direction is a lateral direction. Opposite sides with respect to the first direction are front and back sides. Opposite sides with respect to the second direction are right and left sides.

The bottom, the top, the front, the back, the left and the right surfaces of the case C are the respective outer surfaces of a bottom part C3 namely, the bottom cover 3, a top part C4, namely, the top cover 4, a front part C5, namely, the front cover 5, a back part C6, namely, the back cover 6, a left part C7, namely, the left side cover 7, and a right part C8, namely, the right side cover 8, respectively.

The front cover 5 and the back cover 6 are fastened to reinforcing panels 10 and 11 made of a metal and disposed on the inner sides of the front cover 5 and the back cover 6, respectively. The reinforcing panels 10 and 11 are connected to the bottom cover 3. The left side cover 7 is connected to the reinforcing panels 10 and 11. The right side cover 8 can be opened. A lower end part 8b of the right cover 8 is pivotally connected to the bottom cover 3 so that the right cover 8 can be turned. An upper end part 8a of the right cover 8 can be fastened to the top cover 4 by fastening means, not shown. As shown in FIG. 3, the reinforcing panels 10 and 11 are provided with openings, and respective inward depressed parts 23 and 24 extend into the interior of the case C through the openings of the reinforcing panels 10 and 11, respectively. Terms "inward" and "outward" are used to specify directions into and out of the case C, respectively.

Figure 5:
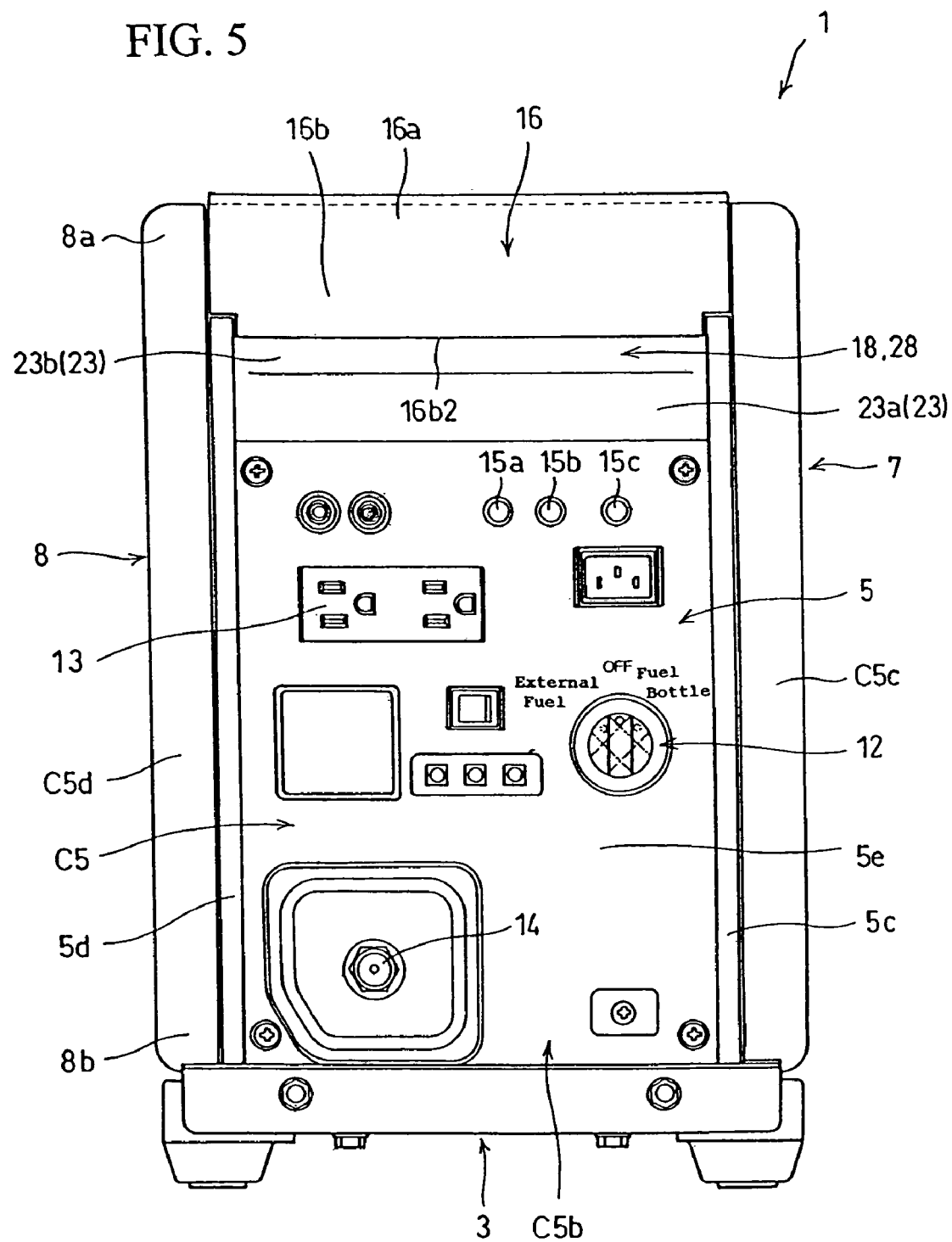
FIG. 5 is a front elevation of the engine generator shown in FIG. 2.

Referring to FIGS. 3 and 5, arranged on an operating panel 5e formed on the front cover 5 are an output receptacle 13, a pipe connector 14 to which a fuel pipe connected to an external fuel bottle 71 shown in FIG. 1 is connected, and pilot lamps 15a, 15b and 15c.

Referring to FIGS. 2 to 5, an upper end part 5a of the front cover 5 and the first carrying handle 16 define a cooling air passage 18. Fresh air, namely, cooling air, flows through the cooling air passage 18 into the internal space 9 of the case C while the engine 30 is in operation. The back cover 6 opposed to the front cover 5 with respect to the engine 30 and the power control unit 41 is provided with a cooling air outlet 20 and an exhaust opening 21. The cooling air used for cooling the engine 30 and the power control unit 41 is discharged to the outside of the case C through the cooling air outlet 20. Exhaust gas discharged from the engine 30 is discharged to the outside through the exhaust opening 21.

The first carrying handle 16 and the second carrying handle 17 to be gripped by the user to lift up and carry the engine generator 1 are combined with the respective upper end parts of the front part C5 and the back part C6 of the case C, respectively. The first carrying handle 16 is disposed in front of the top cover 4 at substantially the same level as the top cover 4. The second carrying handle 17 is disposed behind the top cover 4 at substantially the same level as the top cover. The first carrying handle 16 serves also as a first corner member on top of the front cover 5. The second carrying handle 17 serves also as a second corner member on top of the back cover 6. The first and second corner members respectively forming the upper front corner and the upper back corner of the case C are the first carrying handle 16 and the second carrying handle 17, respectively.

The first carrying handle 16 and the second carrying handle 17, which are made of a synthetic resin, are joined to the top cover 4. Sealing members 22 (FIG. 3) are held between the first carrying handle 16 and the top cover 4 and between the second carrying handle 17 and the top cover 4, respectively. The first carrying handle 16 and the second carrying handle 17 have top parts 16a and 17a and vertical parts 16b and 17b, respectively. The top parts 16a and 17a are the front and back end members of the top part C4 of the case C. The vertical parts 16b and 17b face the front cover 5 and the back cover 6, respectively. Hands are extended along lower parts 16b1 and 17b1, lower end parts 16b2 and 17b2 and inner parts 16b3 and 17b3 of the vertical parts 16b and 17b, respectively, to lift up the engine generator 1. The lower end parts 16b2 and 17b2 correspond to upper end parts 5a and 6a of the front cover 5 and the back cover 6, respectively, with respect to vertical and lateral directions. In this embodiment, the lower end part 16b2 and 17b2 correspond to inward depressed parts 23 and 24, respectively, with respect to vertical and lateral directions.

Figure 4:
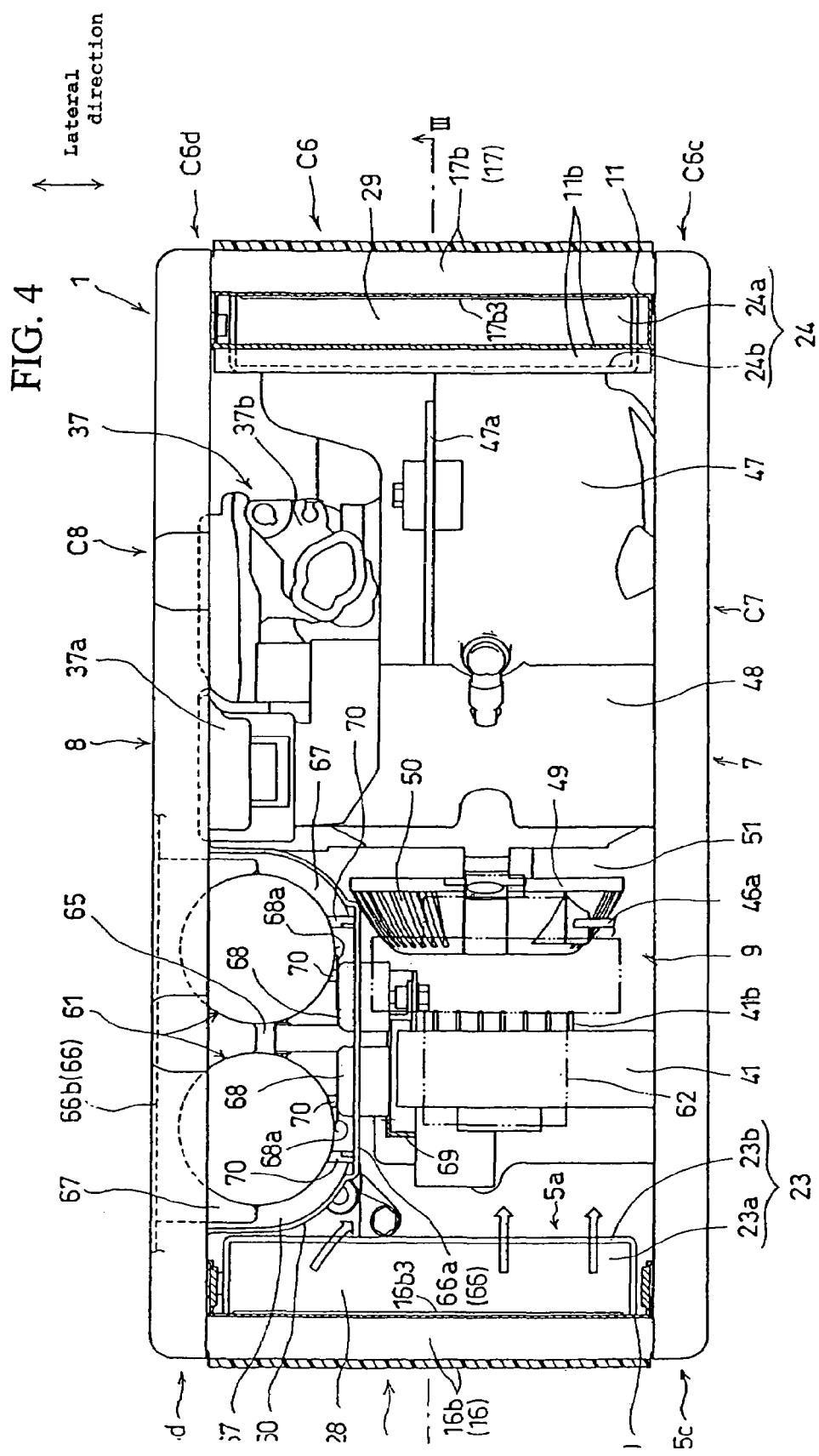
FIG. 4 is a plan view of the engine generator shown in FIG. 2, in which the top cover is removed.

The opposite side ends of the first carrying handle 16 extending to the opposite side ends C5c and C5d of the front part C5 of the case C are joined to the front cover 5 by welding or the like. The opposite side ends of the second carrying handle 17 extending to the opposite side ends C6c and C6d of the back part C6 of the case C are joined to the back cover 6 by welding or the like. The opposite side ends C5c and C5d of the front part C5 of the case C and the opposite side ends C6c and C6d of the back part C6 of the case C are parts of the left side cover 7 and the right side cover 8 or parts corresponding to the left part C7 and the right part C8 of the case C with respect to lateral directions, respectively. As shown in FIG. 4, the respective widths, namely, dimensions with respect to the lateral direction, of the first carrying handle 16 and the second carrying handle 17 are approximately equal to the respective widths of the front cover 5 and the back cover 6, respectively, and is approximately equal to the lateral distance between the left side cover 7 and the right side cover 8.

The first carrying handle 16 and the inward depressed part 23 formed by bending the upper end part 5a of the front cover 5 define the cooling air passage 18. The inward depressed part 23 is on the side of the enclosed space 9 with respect to the first carrying handle 16. The inward depressed part 23 has an inclined part 23a inclined obliquely upward toward the enclosed space 9, and a vertical inner part 23b substantially vertically rising from the inner end of the inclined part 23a. The width of the depressed part 23 is substantially equal to and slightly shorter than that of the first carrying handle 16.

The lower end part 16b2 and the inclined part 23a define an inlet 18a of the cooling air passage 18. The top part 16a of the first carrying handle 16 and the upper end of the inner part 23b define an outlet 18b of the cooling air passage 18. The inlet 18a and the outlet 18b are indicated by two-dot chain lines in FIG. 3. The inlet 18a opens under the first carrying handle 16. The cooling air passage 18 extends in a range substantially corresponding to a range between the opposite ends C5c and C5d of the front part C5 of the case C. The width of the cooling air passage 18 is substantially equal to the width of the front cover 5 and the lateral distance between the left side cover 7 and the right side cover 8. The cooling air that has flowed longitudinally through the inlet 18a into the case C flows upward along the inside surface 16b3 of the vertical part 16b and the vertical inner part 23b. The top part 16a deflects the flow of the cooling air so that the cooling air flows longitudinally into the enclosed space 9. The cooling air flows through the outlet 18b into the enclosed space 9 in the case C. The first carrying handle 16 and the inward depressed part 23 define the labyrinthine cooling air passage 18.

The first carrying handle 16 projects slightly from a right side part 5c and a left side part 5d protruding forward from the operating panel 5e of the front cover 5. A lower end part C5b of the front part C5 of the case C is on the side of the enclosed space 9 with respect to the side parts 5c and 5d.

In this embodiment, a part of the reinforcing panel 10 lying in the cooling air passage 18 serves as a guide part 10a for making the cooling air flow smoothly into the enclosed space 9 in the case C.

The cooling air passage 18 serves also as a first hand space 28 into which hand is inserted to grip the first carrying handle 16 when the user carries the engine generator 1. The cooling air passage 18 extends below the first carrying handle 16. An inner part 18c of the cooling air passage 18 defined mainly by the vertical inner part 23a merges into the enclosed space 9 in the case C. Thus a part of the hand space 28 extends below the top part C4 of the case C in the enclosed space 9 in the case C.

The second carrying handle 17 and the inward depressed part 24 formed by bending the upper end part 6a of the back cover 6 define a second hand space 29. Hands are inserted into the first hand space 28 and the second hand space 29 to grip the first carrying handle 16 and the second carrying handle 17 when the user carries the engine generator 1. The inward depressed part 24 is on the side of the internal space 9 with respect to the second carrying handle 17. The inward depressed part 24 has an inclined part 24a inclined obliquely upward toward the interior 9, and a vertical inner part 24b substantially vertically rising from the inner end of the inclined part 24a. The opposite side ends of the inward depressed part 24 correspond substantially to the opposite side ends of the second carrying handle 17, respectively. The width of the depressed part 24 is substantially equal to and slightly shorter than that of the first carrying handle 16.

A part of the reinforcing panel 11 extending to the top cover 4 serves as a closing part 11b. The closing part 11b closes substantially completely the inner end of the second hand space 29. Thus, fresh air is practically unable to flow through the second hand space 29 into the enclosed space 9 in the case C.

The first carrying handle 16 and the second carrying handle 17 are disposed on the case C symmetrically with respect to a plane of symmetry perpendicular to the longitudinal direction. The inward depressed parts 23 and 24, and the first hand space 28 and the second hand space 29 are substantially symmetrical, respectively, with respect to the plane of symmetry.

Referring to FIGS. 1 and 3, the engine 30 is a single-cylinder four-stroke cycle OHC air-cooled engine. The engine 30 has an engine body 30a. The engine body 30a includes a cylinder 31, a crankcase 32 joined to the lower end of the cylinder 31, a cylinder head 33 formed integrally with the cylinder 31 and a head cover 34 joined to the upper end of the cylinder head 33. A piston 35 is fitted in the cylinder 31 so as to reciprocate in the cylinder 31. The cylinder head 32 and the piston define a combustion chamber. The engine body 30a is fastened to the bottom cover 3. A crankshaft 36 disposed with its axis longitudinally extended is supported for rotation by the cylinder 31 and the crankcase 32. The piston 35 drives the crankshaft 36 for rotation.

Referring to FIGS. 2 and 4, an air intake system 37 connected to the engine 30 includes a carburetor 37b and an intake pipe 37c connected to the cylinder head 33 to carry intake air into the combustion chamber. Part of the cooling air flowed through the cooling air passage 18 into the enclosed space 9 flows through an inlet 37a1 into an air cleaner 37a. The carburetor 37b, namely, an air-fuel mixture producing device, mixes air from the air cleaner 37a and the fuel gas supplied by the fuel supply system Fa or the external fuel system Fb to make an air-fuel mixture. A throttle valve 37b1 included in the carburetor 37b is driven by a stepping motor 37d. The stepping motor 37d is controlled by the ECU 89 including a microcomputer to control the output of the engine 30 so that the crankshaft 36 rotates at a predetermined rotational speed.

An exhaust system 38 connected to the engine 30 includes an exhaust pipe 38a connected to the cylinder head 33 to carry an exhaust gas discharged from the combustion chamber, and a muffler 38b connected to the exhaust pipe 38a.

An intake valve 39a is operated by a valve mechanism mounted on the cylinder head 33. The air-fuel mixture that has flowed through the intake valve 39a into the combustion chamber is ignited by an ignition plug 42 held by a holder 43 as shown in FIG. 3. Combustion pressure produced by the combustion of the air-fuel mixture in the combustion chamber drives the piston 35 to rotate the crankshaft 36. The combustion gas produced by the combustion of the air-fuel mixture is discharged from the combustion chamber through an exhaust valve 39b operated by the valve mechanism. The exhaust gas flows through the exhaust pipe 38a, the muffler 38b and a tail pipe 38c. The exhaust gas is discharged into the atmosphere from the tail pipe 38c opening into an exhaust opening 21 formed in the back cover 6. The muffler 38b deadens the exhaust noise.

Referring to FIGS. 1 and 3, the generator 40 rotatively driven by the engine 30 has a rotor 40a, and a stator provided with coils, disposed diametrically inside the rotor 40a and fastened to the crankcase 32. The rotor 40a is provided with magnets and is fixedly mounted on the crankshaft 36, namely, the output shaft of the engine 30. A capacitor is charged with the power generated by the generator 40. An ignition system including the ignition plug 42 is provided with an ignition coil 44 (FIG. 6) provided with a primary winding connected to the capacitor. The ignition coil 44 raises an input voltage up to a high voltage and applies a high-voltage pulse to the ignition plug 42 in response to an ignition signal provided at a specific crankshaft position.

A cooling fan 45 rotatively driven by the crankshaft 36 is combined with the rotor 40a and rotates together with the rotor 40a to take cooling air, namely, fresh air, through the cooling air passage 18 into the case C while the engine 30 is in operation. The engine 30 is started by operating a recoil starter 46. The recoil starter 46 is connected to the cooling fan 45 and is provided with a rope 46a. A knob connected to the rope 46a is pulled to rotate the crankshaft 36.

Referring to FIGS. 2 to 4, the engine body 30a and the exhaust pipe 38a are covered with a shroud 47 for improved noise suppressing effect and for the improvement of the cooling effect of the cooling air. The shroud 47 defines a cooling air guide passage around the engine body 30a and the exhaust pipe 38a. The shroud 47 is made of a synthetic resin and is fixed to the engine body 30a. A bracket 47a formed integrally with the shroud 47 is fastened to the top cover 4. A fan cover 48 made of a synthetic resin and connected to the front end of the shroud 47 covers the cooling fan 45. A starter cover 49 connected to the front end of the fan cover 48 covers the recoil starter 46. The cooling fan 45 takes air into a space covered with the shroud 47 from the enclosed space 9 through an inlet 50 formed in the starter cover 49 and an inlet 51 defined by the starter cover 49 and the fan cover 48 to send the cooling air past the engine body 30a and the exhaust pipe 38a and out the outlet 20.

A power control unit 41 for controlling the power generated by the generator 40 is disposed on the front side of the cooling fan 45 and the recoil starter 46. The power control unit 41 includes an inverter 41a (FIG. 6) for controlling voltage and frequency, and a heat-radiating fins 41b, namely, heatsink, for dissipating heat generated by electric devices including the inverter 41a.

The power control unit 41, the recoil starter 46, the cooling fan 45, the generator 40, the engine body 30a and the muffler 38b are arranged in that order in a straight arrangement on the axis of the crankshaft 36 in the flowing direction of the cooling air from the cooling air passage 18 toward the cooling air outlet 20 in the internal space 9 in the case C.

Referring to FIG. 1, a fuel system F for supplying the fuel gas to the engine 30 has the fuel supply system Fa, namely, an internal fuel system, and the external fuel system Fb disposed outside the case C. The fuel supply system Fa is included in the engine generator 1 and is disposed on the case C or in the enclosed space 9 of the case C.

Referring to FIGS. 1 to 4, the fuel supply system Fa is provided with one or a plurality of fuel bottles 61, namely, first fuel sources, internal fuel sources or first fuel containers. The fuel bottle 61 or the fuel bottles 61 are contained in a fuel storage structure 60. In this embodiment, the fuel supply system Fa is provided with the two fuel bottles 61. The fuel supply system Fa includes a fuel pressure regulator 62, a heating device 80, a fuel system selector valve 12, namely, a fuel selecting means, fuel pipes, a connector 14, and a fuel cutoff valve 63. The fuel pressure regulator 62 reduces the pressure of the fuel gas supplied from the two fuel bottles 61 and the external fuel bottle 71 and regulates the pressure of the fuel gas so that the fuel gas may be supplied to the carburetor 37b at fuel supply rate varying in proportion to load on the engine 30. The heating device 80 heats the fuel bottles 61 and the fuel pressure regulator 62. The fuel system selector valve 12 is placed on the operating panel Se and is operated to select a fuel supply line. The fuel pipes interconnect the fuel bottles 61, the fuel pressure regulator 62 and the carburetor 37b. The fuel cutoff valve 63 stops the flow of the fuel gas from the fuel system F to the engine 30.

The fuel bottles 61 contain the fuel gas having comparatively high boiling point, such as liquefied butane gas. The fuel bottles 61 are detachably held in the fuel storage structure 60 with the fuel supply devices thereof connected to connectors 64 (FIG. 2) attached to the fuel storage structure 60.

The external fuel system Fb includes the external fuel bottle 71, namely, a second fuel source or an external fuel source, a pipe A5 and a pressure reducing device 72. The external fuel bottle 71 is disposed outside the engine generator 1. The pipe A5 connects the external fuel bottle 71 to the connector 14. The external fuel bottle 71 has a storage capacity greater than that of the fuel bottles 61; that is, the quantity of the fuel gas contained in the external fuel bottle 71 is greater than that of the fuel gas contained in the fuel bottles 61. The external fuel bottle 71 contains a second fuel gas having a boiling point lower than that of the first fuel gas. The second fuel gas is, for example, liquefied propane gas. The external fuel bottle 71 is, for example, a propane gas cylinder for home use.

The fuel storage structure 60 has a case 66 defining a fuel storage chamber 65 for holding the fuel bottles 61. The case 66 has a first side wall 66a made of a metal having a high thermal conductivity, such as aluminum, a second side wall 66b, which is a part of the right cover 8, and a bottom wall 66d. The upper end of the storage chamber 66 opens into the internal space 9. The fuel bottles 61 and the fuel storage structure 60 overlap the power control unit 41, the fuel pressure regulator 62 and the inlets 50 and 51 with respect to the longitudinal direction. The fuel bottles 61 and the fuel storage structure 60 are disposed near the right cover 8. The first side wall 66a separates the fuel bottles 61 from the power control unit 41 and the fuel pressure regulator 62. The first side wall 66a is disposed such that an upper part thereof lies below the outlet 18b of the cooling air passage 18 with respect to the flowing direction of the cooling air and lies under the exit 18*b*. The upper end of the first side wall 66*a* lies substantially at the upper end of the internal space 9. The fuel bottles 61, the first side wall 66*a*, the fuel pressure regulator 62 and the power control unit 41 coincide with the outlet 18*b* with respect to the lateral direction.

A vibration proof holder 67 made of an elastic material is attached to the first side wall 66*a* and the second side wall 66*b* in contact with the fuel bottles 61. The holder 67 serves as a vibration isolator for preventing the fuel bottles 61 from being vibrated by vibrations generated by the operating engine 30.

The fuel storage structure 60 is provided with fuel bottle detectors 68 to detect the fuel bottles 61 held in the fuel storage structure 60. The fuel bottle detectors 68 are attached to a support member 69 disposed outside the fuel storage chamber 65. The fuel bottle detectors 68 penetrate the first side wall 66*a* and protrude into the fuel storage chamber 65. Each of the fuel bottle detectors 68 is, for example, a microswitch provided with an actuator 68*a*. The actuators 68 are pushed by the fuel bottles 61 when the fuel bottles 61 are placed correctly in the fuel storage chamber 65 and thereby the fuel bottles 61 correctly placed in the fuel storage chamber 65 are detected.

The fuel bottles 61 are disposed near the power control unit 41 so that the fuel bottles 61 and the power control unit 41 are able to exchange heat. More specifically, the fuel bottles 61 are thermally connected to the first side wall 66*a* by heat transfer members 70 made of a metal having a high heat conductivity, such as aluminum. The heat transfer members 70 are columnar members each having one end in contact with the fuel bottle 61 and the other end in contact with the first side wall 66*a*. The first side wall 66*a* is disposed close to the power control unit 41 so that the cooling air flowing through the internal space 9 is able to transfer heat efficiently from the power control unit 41 to the first side wall 66*a*. Thus heat generated by the power control unit 41 is transferred to the fuel bottles 61 through the first side wall 66*a* to which the fuel bottles 61 are thermally connected by the heat transfer members 70.

The fuel bottle 61 supplies the first fuel gas in liquid phase to the fuel pressure regulator 62. The external fuel bottle 71 supplies the second fuel gas in gas phase to the fuel gas pressure regulator 62. The fuel gas pressure regulator 62 is disposed directly above the inlets 50 and 51 so as to overlap the fuel bottles 61, the first side wall 66*a* of the fuel storage structure 60, the power control unit 41 and the inlets 50 and 51 with respect to the longitudinal direction. The fuel pressure regulator 62 is disposed near the power control unit 41 to enable the cooling air flowing through the internal space 9 to transfer heat from the power control unit 41 to the fuel pressure regulator 62. In FIG. 4, the fuel pressure regulator 62 is indicated by two-dot chain lines. The fuel pressure regulator 62 functions as a vaporizer for vaporizing the first fuel gas supplied thereto in liquid phase.

Referring to FIG. 1, in the fuel supply system Fa, a first fuel system for supplying the first fuel gas from the fuel bottles 61 to the engine 30 is constituted by the fuel bottles 61, a pipe A1 connecting the fuel bottles 61 to the fuel system selector valve 12, a pipe A2 connecting the fuel system selector valve 12 to the fuel pressure regulator 62, the fuel pressure regulator 62, a pipe A3 connecting the fuel pressure regulator 62 to the carburetor 37*b* and the fuel cut-off valve 63 placed in the pipe A3. A second fuel system for supplying the second fuel gas from the external fuel bottle 71 to the engine 30 is constituted by a pipe A4 connecting the connector 14 to the fuel system selector valve 12, the pipe A2 connecting the fuel system selector valve 12 to the fuel pressure regulator 62, the fuel pressure regulator, the pipe A3 connecting the fuel pressure regulator 62 to the carburetor 37*b* and the fuel cutoff valve 63.

The pipes A1 to A4 extended in the case C form fuel lines. The fuel pressure regulator 62, the pipe A3 and the fuel cutoff valve 63 form a common fuel system for the first and the second fuel system.

The fuel cutoff valve 63, namely, a fuel cutoff means, is, for example, a normally-open solenoid valve which closes when energized. The ECU 89 controls the fuel cutoff valve 63 on the basis of the pressure of the first fuel gas. More specifically, the fuel pressure regulator 62 is provided with a pressure sensor 73 for measuring the pressure of the first fuel gas flowing from the fuel bottle 61 to the fuel pressure regulator 62. When the pressure of the first fuel gas measured by the pressure sensor 73 is higher than an upper limit pressure P1, the ECU 89 closes the fuel cutoff valve 63 to disconnect the common fuel system from the fuel bottle 61. The upper limit pressure P1 is determined beforehand to ensure the safe operation of the engine generator 1 by avoiding the operation of the engine 30 while the pressure of the first fuel gas in the fuel bottles 61 is excessively high due to the excessive heating of the fuel bottles 61.

The fuel system selector valve 12 connects either the first fuel system that supplies the first fuel gas to the engine 30 or the second fuel system that supplies the second gas to the engine 30 selectively to the fuel pressure regulator 62. The fuel system selector valve 12 can be set in a first position, where the knob of the fuel system selector valve 12 is at a first position marked with "Internal fuel" and indicated by chain lines in FIG. 5, to connect the first fuel system to the engine 30 to supply the first fuel gas to the engine 30, in a second position, where the knob of the fuel system selector valve 12 is at a second position marked with "External fuel" and indicated by two-dot chain lines in FIG. 5, to connect the second fuel system to the engine 30 to supply the second fuel gas to the engine 30, and in a cutoff position, where the knob of the fuel system selector valve 12 is at a cutoff position, where the knob of the fuel system selector valve 12 is at a neutral position marked with "Off" and indicated by continuous lines in FIG. 5, to stop supplying fuel gas to the engine 30 by disconnecting both the first and the second fuel systems from the engine 30. The fuel system selector valve 12 is changed from the first to the second position and from the second to the first position via the neutral position.

Figure 6:
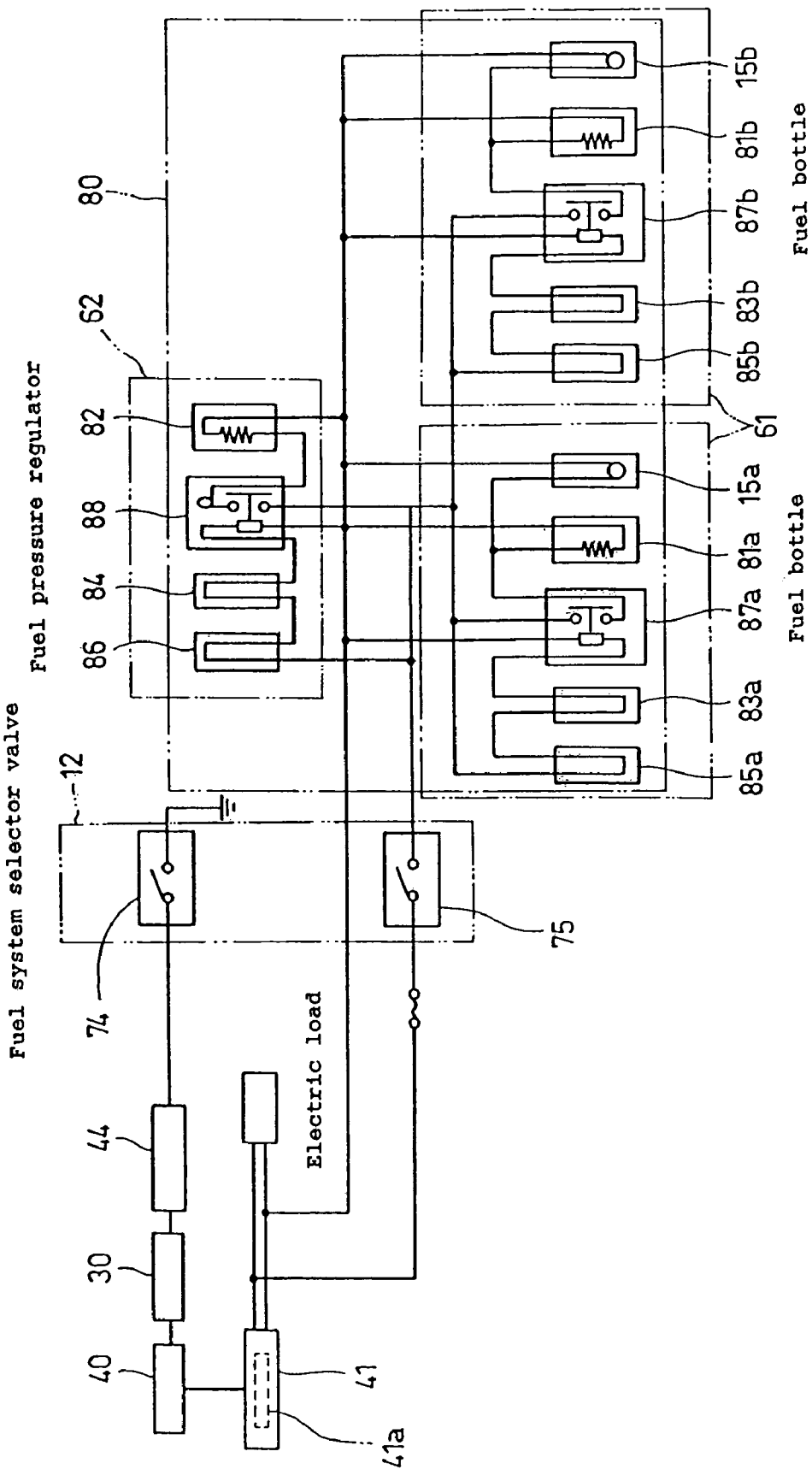
FIG. 6 is a circuit diagram of electrical circuits for controlling a fuel valve and a heating device included in the engine generator shown in FIG. 2.

Referring to FIG. 6, the fuel system selector valve 12 functions, in addition to functioning as means for supplying the first or the second fuel gas selectively to the engine 30, as switches for starting and stopping the engine 30 and controlling the ignition system and the heating device 80. A kill switch 74 for controlling the operation of the ignition system is opened and closed and a main switch 75 for controlling the operation of the heating device 80 is opened and closed according to the operating position of the fuel system selector valve 12.

The heating device 80 includes electric heaters 81*a* and 81*b*, namely, heating means, placed in combination with the fuel bottles 61 in the fuel storage structure 60, an electric heater 82, namely, a heating means, combined with the fuel pressure regulator 62, temperature sensors 83*a*, 83*b* and 84 for measuring the respective temperatures of the fuel bottles 61 and the fuel pressure regulator 62, temperature sensors 85*a*, 85*b* and 86 for measuring the respective temperatures of the electric heaters 81*a*, 81*b* and 82, relays 87*a*, 87*b* and 88 for opening and closing heater circuits for supplying power to the electric heaters 81*a*, 881*b* and 82 in response to control signals given thereto by the ECU 89, and pilot lamps 15*a* and 15*b* (FIG. 5) for indicating impartment of energy to the electric heaters 81*a* and 81*b*.

The electric heaters 81*a*, 81*b* and 82 heat the two fuel bottles 61 and the fuel pressure regulator 62, respectively, to promote the vaporization of the first fuel gas in a liquid phase. Heating the two fuel bottles 61 and the fuel pressure regulator 62 by the heaters 81*a*, 81*b* and 82 prevents the excessive drop of the respective temperatures of the fuel bottles 61 and the fuel pressure regulator 62 due to the vaporization of the first fuel gas and the resultant excessive drop of the pressure of the first fuel gas. Thus, the first fuel gas can be stably supplied to the engine 30.

Referring to FIG. 7 as well, when the fuel system selector valve 12 is set in the first (the second position), the first fuel gas (the second fuel gas) can be supplied to the engine 30 and the kill switch 84 is opened. Consequently, the ignition system is operative and hence the engine 30 is able to operate. When the fuel system selector valve 12 is set in the cutoff position, supply of the first fuel gas or the second fuel gas to the engine 30 is stopped and, consequently, the engine 30 stops. Thus, the fuel system selector valve 12 serves as an engine switch that is opened when the fuel system selector valve 12 is set in the cutoff position.

The main switch 75 is closed only when the fuel system selector valve 12 is set in the first position to make the heating device 80 operative. Consequently, the electric heaters 81*a*, 81*b* and 82 heat the fuel bottles 61 and the fuel pressure regulator 62, respectively. The heating operations of the electric heaters 81*a*, 81*b* and 82 are controlled on the basis of the respective temperatures of the fuel bottles 61 and the fuel pressure regulator 62, respectively. When the fuel system selector valve 12 is set in the second position or the cutoff position, the first fuel gas is not supplied to the engine 30, the main switch 75 opens, the heating device 80 becomes inoperative and the fuel bottles 61 and the fuel pressure regulator 62 are not heated.

The Operation and Effect of the Engine Generator 1 will be Described.

The fuel system selector valve 12 is changed from the cutoff position to the first position to supply the first fuel gas to the engine 30 and the recoil starter 46 is operated to start the engine 30. The engine 30 continues running. The power control unit 41 controls the power generated by the generator 40 driven by the engine 30. The power thus generated is supplied to an electric device connected to the output receptacle 13. The cooling fan 45 driven by the engine 30 sucks air in the enclosed space 9 through the inlets 50 and 51. Then, fresh air, namely, cooling air, is caused to flow through the cooling air passage 18 into the internal space 9 by the suction of the cooling fan 45.

The cooling air flows through the cooling air passage 18 and the top part of the internal space 9 into the internal space 9. Part of the cooling air flows downward to cool the heat-radiating fins 41*b* of the power control unit 41 after transferring heat to the first side wall 66*a* and the fuel pressure regulator 62, transfers heat to the fuel pressure regulator 62 and is sucked through the inlets 50 and 51 into the space inside the shroud 47 by the cooling fan 45. The cooling air flowing inside the shroud 47 cools the engine body 30*a*, the exhaust pipe 38*a* and the muffler 38. Then, the cooling air flows to the outside through the cooling air outlet 20.

When the first fuel gas is consumed by the engine 30 and only a very small quantity of the first fuel gas is left in the fuel bottles 61, the first fuel gas needs to be cutoff and the second fuel gas needs to be supplied. Then, the fuel system selector valve 12 is set in the cutoff position to stop the engine 30. At the same time, the kill switch 74 is closed and the engine 30 can be immediately stopped. Subsequently, the fuel system selector valve 12 is set in the second position to supply the second fuel gas to the engine 30 and the recoil starter 46 is operated to start the engine 30.

The inward depressed part 23 is formed in the front cover 5 of the engine generator 1 on the side of the internal space 9 with respect to the first carrying handle 16, the first carrying handle 16 and the inward depressed part 23 define the cooling air passage 18, the first hand space 28 is formed in the cooling air passage 18, the inward depressed part 24 is formed in the back cover 6 of the engine generator 1 on the side of the internal space 9 with respect to the second carrying handle 17, and the second carrying handle 17 and the inward depressed part 24 define the second hand space 29.

The cooling air passage 18 serves also as the first hand space 28 and is formed in the front cover 5 of the case C defining the internal space 9, the inward depressed parts 23 and 24 are components defining the first hand space 28 and the second hand space 29 an protrude into the internal space 9 of the case C, and the hand spaces 28 and 29 do not extend outside the case C of the engine generator 1. Therefore, protrusion of the first carrying handle 16 and the second carrying handle 17 respectively from the front cover 5 and the back cover 6 of the case C is prevented or limited to a small extent and the first carrying handle 16 and the second carrying handle 17 do not occupy a large space. Consequently, the engine generator 1 has a small size and needs a small space for storage. Since the first carrying handle 16 and the second carrying handle 17 are not prominent, the first carrying handle 16 and the second carrying handle 17 scarcely spoil the aesthetic appearance of the engine generator 1 and the engine generator 1 has a good appearance. Since the cooling air passage 18 contains the first hand space 28, the cooling air passage 18 and the first hand space 28 do not need to be formed separately, which reduces restrictions on the design of the appearance of the case C. The first hand space 28 and the second hand space 29 defined by the front cover 5 and the back cover 6, respectively, facilitate carrying the engine generator 1.

The first carrying handle 16 is cooled by the cooling air flowing through the cooling air passage 18 while the engine 30 is in operation. Therefore, the first carrying handle 16 and the second carrying handle 17 are not excessively heated and can be gripped to carry the engine generator 1 while the engine generator 1 is in operation.

The first carrying handle 16 and the second carrying handle 17 have the vertical parts 16*b* and 17*b* having the lower parts 16*b*1 and 17*b*1, lower end parts 16*b*2 and 17*b*2 and inner parts 16*b*3 and 17*b*3, respectively. Therefore, the first carrying handle 16 and the second carrying handle 17 can be easily gripped by putting hands respectively to the vertical parts 16*b* and 17*b*, which facilitates carrying the engine generator 1.

The labyrinthine cooling air passage 18 can be easily formed by the first carrying handle 16 having the vertical part 16*b*, and the inward depressed part 23 without requiring any complex structure. Since the internal space 9 communicates with the outside space by means of the labyrinthine cooling air passage 18, outward propagation of noise generated by the operating engine generator 1 through the cooling air passage 18 can be effectively suppressed. Consequently, the leakage of the noise generated by the operating engine generator 1 from the case C through the cooling air passage 18 can be suppressed without increasing the cost of the engine generator 1.

The first carrying handle 16 is disposed in the front part C5 of the case C, the inlet 18a of the cooling air passage 18 is formed below the first carrying handle 16, and the first carrying handle 16 and the cooling air passage 18 extend laterally over the entire width of the front part C5 of the case C. Therefore, hands can be put on an optional part, suitable for carrying the engine generator 1, of the first carrying handle 16 extending in a wide lateral range to grip the first carrying handle 16, which facilitates carrying the engine generator 1. The inlet of the cooling air passage 18 can be formed in a large area without spoiling the aesthetic appearance of the engine generator 1, the cooling air flowing through the laterally wide cooling air passage into the case suppresses the stagnation of air in the case and, consequently, the engine 30, the generator 40 and the power control unit 41 can be efficiently cooled.

Since the cooling air passage 18 is formed in an upper part of the front cover 5, hot air heated by the engine 30, the generator 40 and the power control unit 41 in the state of hot soak immediately after the stop of the engine 30 and rising upward by convection can easily flow to the outside through the cooling air passage 18. Thus the natural ventilation of the internal space 9 in the case C is promoted and the cooling of the engine 30, the generator 40 and the power control unit 41 immediately after the stop of the engine 30 is promoted.

The first carrying handle 16 projects slightly from the right side part 5c and the left side part 5d protruding forward from the operating panel 5e of the front cover 5. The lower part C5b of the front part C5 of the case C is on the side of the internal space 9 with respect to the side parts 5c and 5d. Even if the engine generator 1 is installed with the front cover 5 in contact with an external structure, such as a wall, a space between the side parts 5c and 5d opens downward and the vertical part 16b of the first carrying handle 16 protrudes forward beyond the side parts 5c and 5d. Consequently, fresh air, namely, cooling air, can be sufficiently taken through the space between the side parts 5c and 5d of the case and the external structure into the cooling air passage 18.

The fuel bottles 61 and the fuel pressure regulator 62 are disposed close to the power control unit 41 so that heat can be transferred from the power control unit 41 to the fuel bottles 61 and the fuel pressure regulator 62. Therefore, the cooling air is able to transfer heat generated by the power control unit 41 to the fuel bottles 61 and the fuel pressure regulator 62, which are cooled at low temperatures during the operation of the engine generator 1 by the endothermic vaporization of the fuel gas. Therefore, heat generated by the power control unit 41 can be efficiently dissipated. In other words, the fuel bottles 61 and the fuel pressure regulator 62 promote cooling of the power control unit 41. Consequently, the rise of the temperature of the power control unit 41 can be suppressed, the fuel bottles 61 and the fuel pressure regulator 62 can be heated by the heat generated by the power control unit 41 and, consequently, the drop of the temperatures of the fuel bottles 61 and the fuel pressure regulator 62 can be suppressed. Thus the rise of the temperature of the power control unit 41 can be suppressed and hence the heat-radiating fins 41b of the power control unit 41 may be small. Since the drop of the temperatures of the fuel bottles 61 and the fuel pressure regulator 62 can be suppressed, the thermal output of the heating device 80 can be reduced and the power consumption of the electric heaters 81a, 81b and 82, namely, heat sources, can be reduced.

The fuel bottles 61 is thermally connected to the first side wall 66a defining the fuel storage chamber 65 by the heat transfer member 70, and the power control unit 41 is disposed near the first side wall 66a so that heat can be easily transferred from the power control unit 41 to the first side wall 66a. Consequently, heating the fuel bottles 61 by heat from the power control unit 41 and dissipating heat generated by the power control unit 41 are achieved by heat transfer through the first side wall 66a to the fuel bottles 61. Therefore, there are only a few restrictions on the arrangement of the fuel bottles 61 and the power control unit 41 to enable heat exchange between the fuel bottles 61 and the power control unit 41. The rate of heat transfer from the power control unit 41 to the fuel bottles 61 can be increased by properly designing the shape and disposition of the first side wall 66a, such as increasing the size of the first side wall 66a and disposing the first side wall 66a closer to the power control unit 41. Thus the utilization of heat by the fuel bottles 61 and the power control unit 41 can be increased. Consequently, the first side wall 66a enables the effective use of heat generated by the power control unit 41 by the fuel bottles 61 and the efficient dissipation of the heat generated by the power control unit 41, the degree of freedom of arranging the fuel bottles 61 and the power control unit 41 increases, the utilization of heat by the fuel bottles 61 and the dissipation of heat generated by the power control unit 41 can be enhanced, the power control unit 41 can be efficiently cooled by the fuel bottles 61 and the fuel bottles can be efficiently heated by the power control unit 41.

At least part of the cooling air that has flowed through the cooling air passage 18 into the internal space 9 flows past the first side wall 66a contiguous with the fuel bottles 61, the fuel pressure regulator 62, the power control unit 41, the generator 40 and the engine 30 in that order. Consequently, the cooling air that has flowed into the internal space 9 is cooled by the fuel bottles 61 and the fuel pressure regulator 62 and the temperature of the cooling air drops to a lower temperature. Thus the generator 40 and the engine 30 can be effectively cooled by the cooling air thus cooled by the fuel bottles 61 and the fuel pressure regulator 62. Consequently, the thus cooled cooling air exercises a high cooling effect on the generator 40 and the engine 30.

The inverter 41a causing a large switching loss and generating a large amount of heat is heated at high temperatures. The fuel bottle 61 and the fuel pressure regulator 62 cool the hot inverter 41a effectively to suppress the rise of the temperature of the inverter 41a. On the other hand, the hot inverter 41 heats the fuel bottles 61 and the fuel pressure regulator 62 effectively to suppress the drop of the temperatures of the fuel bottles 61 and the fuel pressure regulator 62. Consequently, the inverter 41a that generates heat at high rate is effectively cooled and the fuel bottles 61 and the fuel pressure regulator 62 are heated effectively by the inverter 41a.

The fuel pressure regulator 62 is disposed directly above the power control unit 41 so as to correspond longitudinally and laterally to the cooling air passage 18. The fuel pressure regulator 62 deflects the cooling air that has flowed through the cooling air passage 18 into the internal space 9 toward the power control unit 41. Thus the power control unit 41 can be efficiently cooled by the cooling air flowing in the internal space 9 immediately after passing the cooling air passage 18.

Since the inlets 50 and 51 are positioned so as to overlap the first side wall 66a and the fuel pressure regulator 62 with respect to a longitudinal direction, the cooling air cooled by the first side wall 66a and the fuel pressure regulator 62 flows through the inlets 50 and 51. Consequently, the engine body 30a and the muffler 38b are cooled efficiently.

Figure 8:
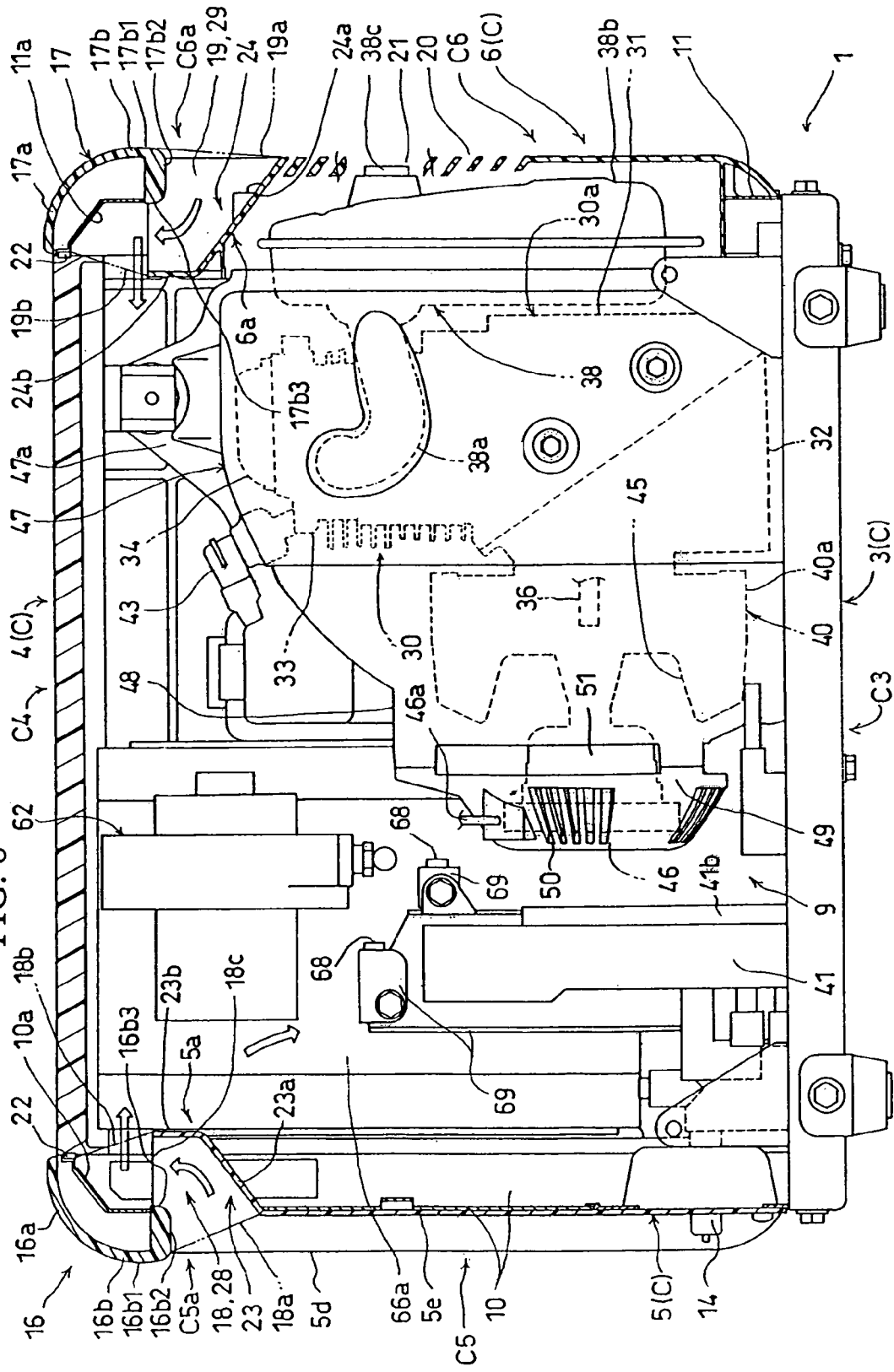
FIG. 8 is a sectional side elevation, similar to FIG. 3, of an engine generator in a second embodiment of the present invention.
Figure 9:
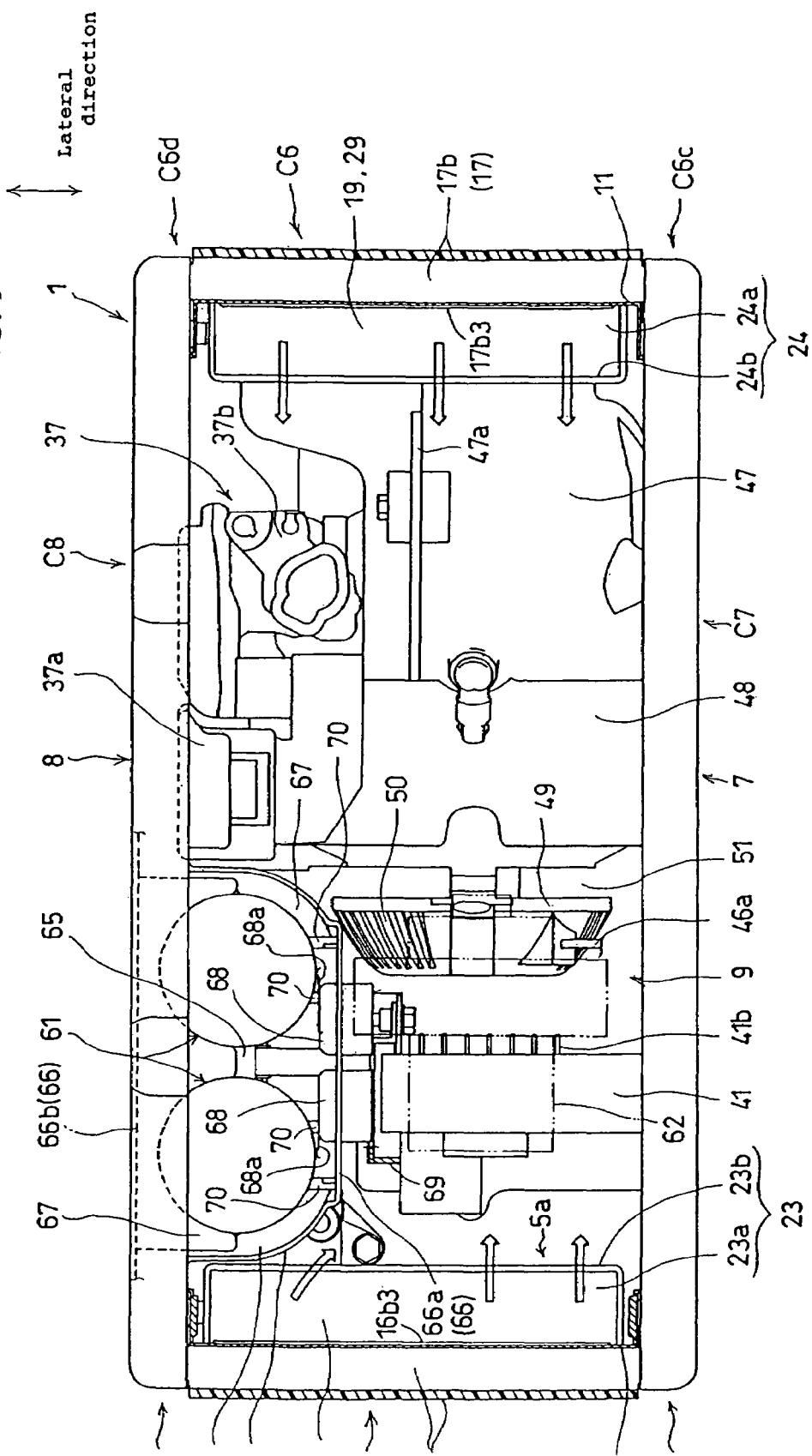
FIG. 9 is a plan view, similar to FIG. 4, of the engine generator shown in FIG. 8.

An engine generator 1 in a second embodiment of the present invention will be described with reference to FIGS. 8 and 9, in which parts like or corresponding to those of the engine generator 1 in the first embodiment are denoted by the same reference characters and the description thereof will be omitted for simplicity. The engine generator 1 in the second embodiment differs from the engine generator 1 in the first embodiment in that the engine generator 1 in the second embodiment is has a second carrying handle 17 defining a cooling air passage.

The second carrying handle 17 and an inward depressed part 24 define a second cooling air passage 19. A lower end part 17b2 of a vertical part 17b of the second carrying handle 17 and an inclined part 24a define an inlet 19a of the cooling air passage 19. The inlet 19a opens backward. A top part 17a of the second carrying handle 17 and the upper end of an inner part 24b define an outlet 19b of the cooling air passage 19. The inlet 19a opens under the second carrying handle 17. The cooling air passage 19 extends in a range substantially corresponding to a range between the opposite ends C6c and C6d of the back part C6 of a case C. The width of the cooling air passage 19 is equal to that of a first cooling air passage 18 and is substantially equal to the width of a back cover 6.

Cooling air that has flowed through the inlet 19a into the case C flows longitudinally into the internal space 9, flows upward along the inside surface 17b3 of the vertical part 17b and the vertical inner part 24b. The top part 17a deflects the flow of the cooling air so that the cooling air flows longitudinally into the internal space 9. The cooling air flows through the outlet 19b into the internal space 9 in the case C. The second carrying handle 17 and the inward depressed part 24 define the labyrinthine cooling air passage 19.

A part of a reinforcing panel 11 lying in the cooling air passage 19 serves as a guide part 11a for making the cooling air flow smoothly into the internal space 9 in the case C.

The cooling air passage 19 serves also as a second hand space 29 into which hand is inserted to grip the second carrying handle 17 when the user carries the engine generator 1. The cooling air passage 19 extends below the second carrying handle 17. An inner part 19c of the cooling air passage 19 defined mainly by the vertical inner part 24a merges into the internal space 9 in the case C. Thus a part of the second hand space 29 extends below a top part C4 of the case C in the internal space 9 in the case C.

The engine generator 1 in the second embodiment has the following functions and effects in addition to functions and effects similar to those of the engine generator 1 in the first embodiment.

The first carrying handle 16 and the second carrying handle 17 are combined with a front cover 5 and the back cover 6 of the case C on the opposite sides of a generator 40 and an engine 30, respectively. The first carrying handle 16 and an inward depressed part 23 formed in the front cover 5 define the cooling air passage 18. The second carrying handle 17 and an inward depressed part 24 formed in the back cover 6 define the cooling air passage 19. The cooling air flows through the cooling air passages 18 and 19 formed on the opposite sides of the engine 30 and the generator 40, respectively, into the internal space 9. Thus the temperature of the cooling air immediately after the cooling air has flowed through the two cooling air passages 18 and 19 into the internal space 9 is comparatively low as compared with that of the cooling air that flowed through the single cooling air passage into the internal space 9. Consequently, the engine 30 and the generator 40 are cooled efficiently by the cooling air having a comparatively low temperature. When the cooling air passages 18 and 19 are thus formed, hot air heated by the engine 30 and the generator 40 in the state of hot soak immediately after the stop of the engine 30 and rising upward by convection can easily flow to the outside through the cooling air passages 18 and 19 formed respectively in upper parts C5a and C6a of a front part C5 and a back part C6 of the case C. Thus the two cooling air passages 18 and 19 facilitate the flow of the cooling air outside the case C, and the natural ventilation of the internal space 9 in the case C is promoted. Consequently, the cooling air that has flowed through the two cooling air passages 18 and 19 into the internal space 9 improves the effect of cooling the engine 30, the generator 40 and a power control unit 41 and that of cooling the engine 20, the generator 40 and the power control unit 41 immediately after the stop of the engine 30.

The cooling air passages 18 and 19 are formed opposite to each other with respect to a direction in which the power control unit 41, the generator 40 an engine body 30a and a muffler 38b are arranged linearly. The cooling air that has flowed through cooling air passage 18 near the power control unit 41 cools the power control unit 41, the generator 40, the engine body 30a and the muffler 3 8b in that order. Most part of the cooling air that has flowed through the cooling air passage 19 near the engine 30 flows around a shroud 47, is sucked through inlets 50 and 51 by a cooling fan 45 into a space surrounded by the shroud 47 and cools the generator 40, the engine body 30a and the muffler 38b in that order. Consequently, the generator 40 and the engine 30 are cooled by the cooling air that has been scarcely heated by the power control unit 41. Thus the effect of cooling the generator 40, the engine body 30a and the muffler 38b can be improved.

Modifications in the Foregoing Embodiments will be Described.

Figure 10:
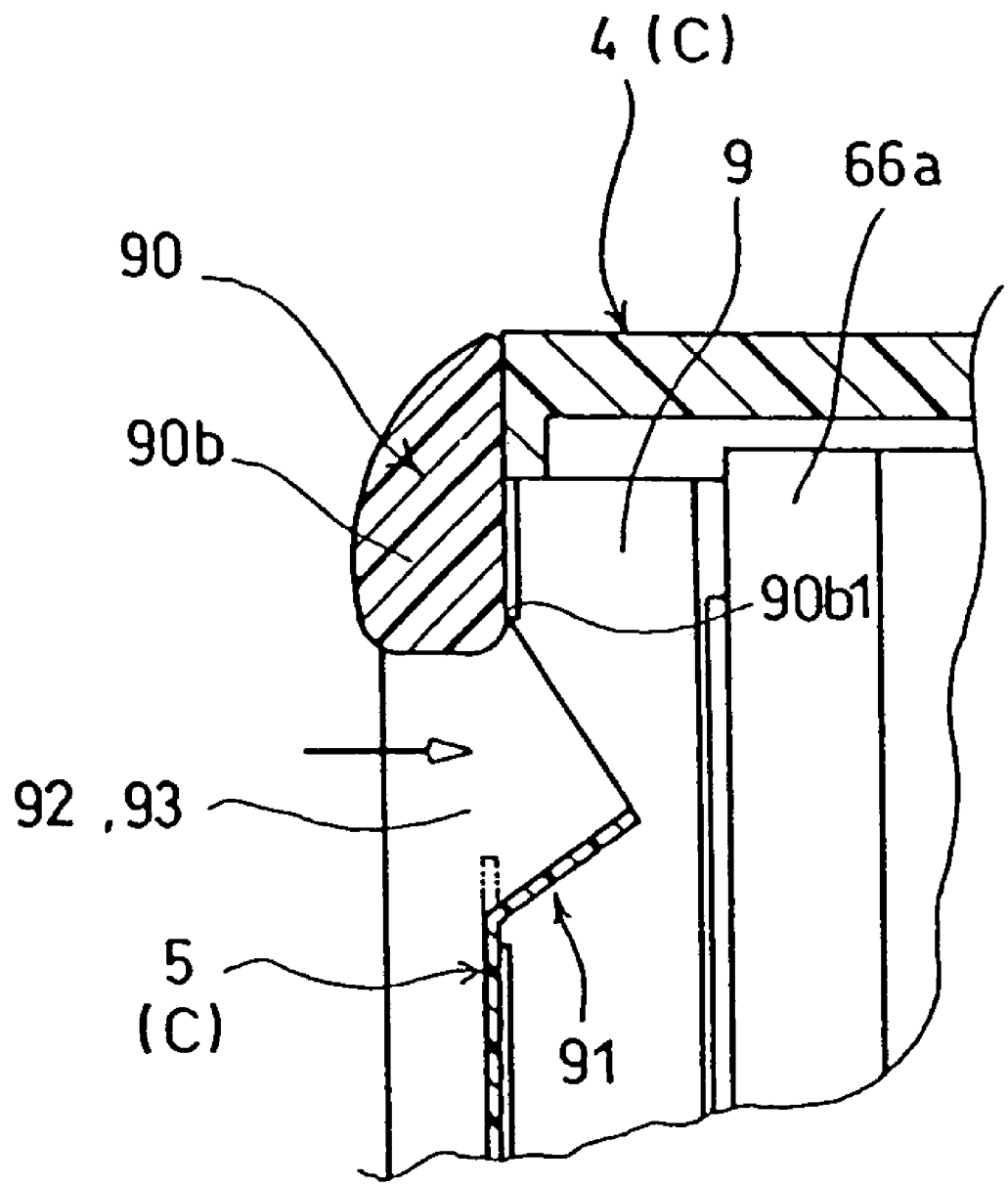
FIG. 10 is a sectional view of a part of an engine generator in a third embodiment of the present invention.

A first hand space 93 may be formed instead of the first hand space 28. The first hand space 93 does not extend only in the cooling air passage 18. As shown in FIG. 10, the first hand space 98 extends in part of the internal space 9 and a first cooling air passage 92. More specifically, a first carrying handle 90 defines the first cooling air passage 92 together with an inward inclined part 91 of a front cover 5 and defines the internal space 9 together with the front cover 5 and other covers including a cover 4. An inner part 90b1 of a vertical part 90b on which hand is put to grip the first carrying handle 90 is one of the members defining the internal space 9. A second hand space defined by a second carrying handle and a back cover may be closed similarly to that of the first embodiment. The second hand space may be formed, similarly to the first hand space 93, in part of the enclosed space 9 and a second cooling air passage defined by the second carrying handle and an inclined part of the back cover. As indicated by two-dot chain lines in FIG. 10, the front cover 5 and the back cover do not need to be provided with inward depressed parts for defining the first and the second cooling air passage.

When inward depressed parts are not formed in the front cover 5 and the back cover, the cooling air passage 92 serves also as the first hand space 93. The first hand space 93 is formed in the front cover 5 defining the enclosed space 9 and a part of the internal space 9 serves as a part of the first hand space 93. Since the hand spaces are not formed outside the case C, protrusion of the first carrying handle 90 from the front cover 5 of the case C is prevented or limited to a small extent. Consequently, the engine generator 1 has a small size and needs a small space for storage and restrictions on the design of the appearance of the case C can be reduced. Thus the advantages of this modification are similar to those of the first embodiment.

Although the case C of each of the foregoing embodiments has the six covers, the case C may be made up of any suitable number of covers other than six covers.

The first carrying handle 16 and the cooling air passages 18 and 92 may be formed in an upper part, a lower part or a vertically middle part of the front part C5 of the case C or in the top part C4 of the case C instead of in the upper end part of the front part C5 of the case C, and the second carrying handle 17 and the cooling air passages 19 may be formed in an upper part, a lower part or a vertically middle part of the back part C6 of the case C or in the top part C4 of the case C instead of in the upper end part of the back part C6 of the case C. Each of the cooling air passages 18, 19 and 92 may be divided into a plurality of laterally arranged sections, provided that the first hand spaces 28 and 93 and the second hand space 29 are formed.

Although the first and the second carrying handle of the foregoing embodiments are formed entirely of carrying handle forming members, each of the first and the second carrying handles may be formed of a carrying handle forming member and part of the member of the case C, such as the front cover 5, the back cover 6 or the top cover 4 formed integrally with the carrying handle forming member, may be formed of a member joined to the member of the case. The first and the second carrying handles may be formed in a shape such that hands can be put thereon.

At least the fuel bottles 61, the case 66 or the fuel pressure regulator 62 may be thermally connected through a heat-conducting member made of a material having a high heat conductivity or may be connected directly to the heat-radiating fins 41b of the power control unit 41. Thus heat can be transferred from the power control unit 41 to at least the fuel bottles 61 or the fuel pressure regulator 62 by thermal conduction through the heat-conducting member. Consequently, heat generated by the power control unit 41 can be efficiently used by at least the fuel bottles 61 or the fuel pressure regulator 62. Since heat generated by the power control unit 41 can be efficiently transferred at least the fuel bottles 61 or the fuel pressure regulator 62, the effect of at least the fuel bottles 61 or the fuel pressure regulator 62 on cooling the power control unit 41 and the effect of the power control unit 41 on heating at least the fuel bottles 61 or the fuel pressure regulator 62 can be improved.

Either the fuel bottles 61 or the fuel pressure regulator 62 may be disposed relative to the power control unit 41 so that heat can be exchanged between the power control unit 41, and the fuel bottles 61 or the fuel pressure regulator 62.

The fuel bottles 61 need not necessarily be placed in the fuel storage structure 60 and the case separating the fuel bottles 61 from the power control unit 41 may be omitted.

The first fuel gas may be supplied in gas phase to the fuel pressure regulator 62. The second fuel gas may be a gas other than propane gas, such as a town gas. The second fuel source may be a gas supply pipe for carrying the second fuel gas.

The heat source of the heating device 80 may be any suitable heating means other than the electric heater, such as a heating means using the heat of the exhaust gas discharged from the engine, namely, waste heat. Since the fuel bottles 61 and the fuel pressure regulator 62 are heated by the heat generated by the power control unit 41 to suppress the drop of the temperatures of the fuel bottles 61 and the fuel pressure regulator 62, the heat source may be that of a comparatively low temperature and the heat source can be chosen from a large variety of heat sources. The heating device for heating the fuel bottles 61 or the fuel pressure regulator 62 can be omitted.

Although there have been described what are the present exemplary embodiments of the invention, it will be understood that variations and modifications may be made thereto within the spirit and scope of the appended claims.

The invention claimed is:

1. An engine operated generator comprising a fuel receptacle storing a fuel gas in liquefied state, an engine that receives the fuel gas from the fuel receptacle, a fuel pressure regulator for regulating pressure of the fuel gas supplied from the fuel receptacle to the engine, a generator driven by the engine, and a power control unit for controlling power generated by the generator, wherein at least one of the fuel receptacle and the fuel pressure regulator is arranged adjacent to the power control unit, for heat exchange with the power control unit.

2. The engine operated generator as claimed in claim 1, comprising a fuel storage chamber for storing the fuel receptacle, the fuel storage chamber having a side wall and a heat transfer device made of a heat conducting material, the fuel receptacle and the side wall being thermally connected via the heat transfer device, said side wall being disposed adjacent to the power control unit to enable heat exchange with the power control unit.

3. The engine operated generator as claimed in claim 2, wherein said heat transfer device comprises a plurality of columnar members provided between the fuel receptacle and the side wall of the fuel storage chamber in contact with the fuel receptacle and the side wall.

4. The engine operated generator as claimed in claim 3, wherein the power control unit has an inverter.

5. The engine operated generator as claimed in claim 3, comprising a case forming an internal space for accommodating the fuel receptacle, the engine and the generator; and a cooling air passage for conducting cooling air from said internal space sequentially past the fuel receptacle, the power control unit in this order, to the generator and the engine to cool the same.

6. The engine operated generator as claimed in claim 5, wherein the fuel pressure regulator and the power control unit are disposed on a side opposite the fuel storage chamber with respect to said side wall, and the power control unit is disposed below the fuel pressure regulator.

7. The engine operated generator as claimed in claim 6, wherein said case has a side wall having an upper edge along which a cooling air inlet passage is provided, and the fuel pressure regulator is provided immediately downstream of the cooling air inlet passage.

8. The engine operated generator as claimed in claim 2, wherein the power control unit has an inverter.

9. The engine operated generator as claimed in claim 2, comprising a case forming an internal space for accommodating the fuel receptacle, the engine and the generator; and a cooling air passage for conducting cooling air from said internal space sequentially past the fuel receptacle, the power control unit in this order, to the generator and the engine to cool the same.

10. The engine operated generator as claimed in claim 9, wherein the fuel pressure regulator and the power control unit are disposed on a side opposite the fuel storage chamber with respect to said side wall, and the power control unit is disposed below the fuel pressure regulator.

11. The engine operated generator as claimed in claim 10, wherein said case has a side wall having an upper edge along which a cooling air inlet passage is provided, and the fuel pressure regulator is provided immediately downstream of the cooling air inlet passage.

12. The engine operated generator as claimed in claim 1, wherein at least one of the fuel receptacle and the fuel pressure regulator is in direct thermal connection with the power control unit via a heat transfer device made of a material of high heat conductivity.

13. The engine operated generator as claimed in claim 12, wherein the power control unit has an inverter.

14. The engine operated generator as claimed in claim 12, comprising a case forming an internal space for accommodating the fuel receptacle, the engine and the generator; and a cooling air passage for conducting cooling air from said internal space sequentially past the fuel receptacle, the power control unit in this order, to the generator and the engine to cool the same.

15. The engine operated generator as claimed in claim 14, wherein the fuel pressure regulator and the power control unit are disposed on a side opposite the fuel storage chamber with respect to said side wall, and the power control unit is disposed below the fuel pressure regulator.

16. The engine operated generator as claimed in claim 15, wherein said case has a side wall having an upper edge along which a cooling air inlet passage is provided, and the fuel pressure regulator is provided immediately downstream of the cooling air inlet passage.

17. The engine operated generator as claimed in claim 1, wherein the power control unit has an inverter.

18. The engine operated generator as claimed in claim 1, comprising a case forming an internal space for accommodating the fuel receptacle, the engine and the generator; and a cooling air passage for conducting cooling air from said internal space sequentially past the fuel receptacle, the power control unit in this order, to the generator and the engine to cool the same.

* * * * *